(12) United States Patent
Yamamoto

(10) Patent No.: US 6,790,553 B1
(45) Date of Patent: Sep. 14, 2004

(54) METHOD FOR PRODUCING BRIDGED POLYMER MEMBRANE AND FUEL CELL

(75) Inventor: Tetsu Yamamoto, Kawagoe (JP)

(73) Assignee: Celanese Ventures GmbH (DE)

( * ) Notice: Subject to any disclaimer, the term of this patent is extended or adjusted under 35 U.S.C. 154(b) by 0 days.

(21) Appl. No.: 09/889,971

(22) PCT Filed: Jan. 15, 2000

(86) PCT No.: PCT/EP00/00280

§ 371 (c)(1),
(2), (4) Date: Sep. 6, 2001

(87) PCT Pub. No.: WO00/44816

PCT Pub. Date: Aug. 3, 2000

(30) Foreign Application Priority Data

Jan. 27, 1999 (JP) ............................................ 11-018090
Jun. 4, 1999 (JP) ............................................ 11-157509

(51) Int. Cl.$^7$ ............................................... H01M 8/10
(52) U.S. Cl. ........................... 429/33; 429/30; 429/304; 429/307; 429/310; 252/62.2; 521/27; 521/30; 521/33; 204/296; 525/431; 525/432
(58) Field of Search .......................... 252/62.2; 429/30, 429/33, 307, 304, 310; 521/27, 30, 33; 204/296; 525/431, 432

(56) References Cited

U.S. PATENT DOCUMENTS

| | | | | |
|---|---|---|---|---|
| 4,584,103 A | | 4/1986 | Linder et al. ................ 210/650 |
| 5,066,697 A | * | 11/1991 | Sandor et al. ............... 524/233 |
| 5,137,985 A | * | 8/1992 | Chen et al. .................. 525/431 |
| 5,409,785 A | | 4/1995 | Nakano et al. ................ 429/33 |
| 5,429,759 A | | 7/1995 | Andrieu et al. ............. 252/62.2 |
| 5,525,436 A | * | 6/1996 | Savinell et al. ............... 429/30 |
| 5,599,639 A | * | 2/1997 | Sansone et al. ................ 429/33 |
| 6,124,060 A | * | 9/2000 | Akita et al. ................. 429/307 |
| 6,632,847 B1 | * | 10/2003 | Soczka-Guth et al. ........ 521/27 |

FOREIGN PATENT DOCUMENTS

| | | |
|---|---|---|
| EP | 0 025 973 | 4/1981 |
| EP | 0 419 396 | 3/1991 |

OTHER PUBLICATIONS

Derwent Abs. of published Japanese appln. JP–A–09/157412, (Toku) Tokuyama Soad KK, XP–002138059, "Preparation ion exchange membrane polymerise ethylene alpha unsaturated carboxylic acid copolymer powder monomer contain function ion exchange group bridge agent initiate," Jun. 17, 1997.

* cited by examiner

Primary Examiner—Bruce F. Bell
(74) Attorney, Agent, or Firm—Connolly Bove Lodge & Hutz LLP

(57) ABSTRACT

A method for producing a bridged polymer membrane includes the steps of: obtaining a liquid medium comprising a basic polymer having an amino group in a repeating unit, a bridging agent, and a solvent; shaping the liquid medium into a membrane configuration to obtain the shaped membrane; and bridging the basic polymer by the bridging agent in the shaped membrane. A fuel cell has the bridged polymer membrane. The mechanical strength of the polymer electrolyte membrane is improved.

15 Claims, 2 Drawing Sheets

METHOD FOR PRODUCING BRIDGED POLYMER MEMBRANE AND FUEL CELL

FIELD OF THE INVENTION

The present invention relates to a method for producing a bridged polymer membrane and a fuel cell.

RELATED ART

A cell includes an electrolyte and a pair of electrodes separated by the electrolyte. In case of a fuel cell, a fuel such as a hydrogen gas is supplied to one of the electrodes, and an oxidizing agent such as an oxygen gas is supplied to the other electrode, thereby converting chemical energy involved in the oxidation of the fuel into electric energy. The electrolyte permeates hydrogen ions, that is, protons but by does not permeate reactive gases such as the hydrogen gas and the oxygen gas. Typically, a fuel cell has a plurality of single cells, and each of the single cells has an electrolyte and a pair of electrodes separated by the electrolyte.

As the electrolyte for the fuel cell, a solid such as a polymer electrolyte membrane and a liquid such as phosphoric acid are used. Recently, the polymer electrolyte membranes have been receiving attention as the electrolytes for the fuel cell. For example, perfluorosulfonic acid polymers and complexes between basic polymers and strong acids are used as materials for the polymer electrolyte membranes.

Typically, the perfluorosulfonic acid polymer has a framework of perfluorocarbon such as a copolymer of tetrafluoroethylene and trifluorovinyl and a side chain being bonded thereto and having a sulfonic acid group such as a side chain that a sulfonic acid group is bonded to perfluoroalkylene group. The sulfonic acid group releases a hydrogen ion to convert into an anion, and therefore conducts proton.

Polymer electrolyte membranes comprising complexes of basic polymers and strong acids have been developed. International Publication WO96/13872 and its corresponding U.S. Pat. No. 5,525,436 disclose a method for producing a proton conductive polymer electrolyte membrane by immersing a basic polymer such as polybenzimidazoles in a strong acid such as phosphoric acid, sulfuric acid and so on. The fuel cell employing such a polymer electrolyte membrane has the advantage that it can be operated at 100° C. or above.

J. Electrochem. Soc., Vol. 142, No. 7,1995, ppL121–L123 describes that immersing a polybenzimidazole in 11M phosphoric acid for at least 16 h impregnates five molecules of phosphoric acid per unit of the polybenzimidazole.

Further, International Publication WO97/37396 and its corresponding U.S. Pat. No. 5,716,727 describe a method for producing a polymer electrolyte membrane by obtaining a solution of a polybenzimidazole dissolved in trifluoroacetic acid, followed by adding phosphoric acid to the solution, and subsequently by removing the solvent.

The whole disclosures of WO 96/13872, J. Electrochem. Soc., Vol. 142, No. 7, 1995, ppL121–L123 and WO97137396 are incorporated herein as reference.

Even though a basic polymer by itself has a sufficient mechanical strength, there are cases that the mechanical strength of the basic polymer decreases to an insufficient degree by impregnating the basic polymer with a strong acid for providing proton conductivity. Therefore, it is desired to further improve the mechanical strength of the basic polymer for applying the complex of the basic polymer and the strong acid to the electrolyte membrane for the fuel cell and so on.

U.S. Pat. No. 5,599,639 describes a basic polymer wherein a sulfonic acid group is introduced into a basic polymer such as polybenzimidazole and so on through a linker such as an alkylene and so on. The basic polymer is required to incorporate water therein for providing proton conductivity so that the basic polymer may be used as the electrolyte membrane for the fuel cell.

However, when the basic polymer is immersed in water, there are cases that the basic polymer swells and that a sufficient mechanical strength is not achieved. The whole disclosure of U.S. Pat. No. 5,599,639 is incorporated herein as reference. The present inventors tried to improve the mechanical strength by shaping a basic polymer into a membrane configuration followed by reacting with an external bridging agent. However, the basic polymer in a gel or solid form did not smoothly react with the external bridging agent.

SUMMARY OF THE INVENTION

To solve the aforementioned problem, the present invention is accomplished by shaping a basic polymer into a membrane configuration followed by proceeding a bridging reaction.

According to one aspect of the present invention, there is provided a method for producing a bridged polymer membrane, comprising the steps of: obtaining a liquid medium comprising a basic polymer having an amino group in a repeating unit, a bridging agent, and a solvent; shaping the liquid medium into a membrane configuration to obtain a shaped membrane; and bridging the basic polymer by the bridging agent in the shaped membrane.

Preferably, the bridging agent has at least two epoxy groups or isocyanate groups in the molecule thereof.

Preferably, the liquid medium contains 0.001 to 0.8 mole of the bridging agent per unit of the basic polymer.

Preferably, the basic polymer is selected from the group consisting of polybenzimidazoles, polyimidazoles, polyvinylimidazoles, and polybenzbisimidazoles.

Preferably, the method may further comprise the step of impregnating the basic polymer with a strong acid for providing proton conductivity. The strong acid may be impregnated in the form of the liquid medium. Alternatively, the strong acid may be impregnated after the shaping but before the heating. Alternatively, the strong acid may be impregnated after heating.

Alternatively, the basic polymer may have a strong acid group in the repeating unit in the basic polymer. The presence of the strong acid provides proton conductivity.

According to another aspect of the present invention, there is provided a fuel cell comprising a plurality of single cells, each of the single cells comprising a bridged polymer membrane obtained by the aforementioned method and a pair of electrodes sandwiching the bridged polymer membrane.

PREFERRED EMBODIMENTS OF THE INVENTION

Figure 1:
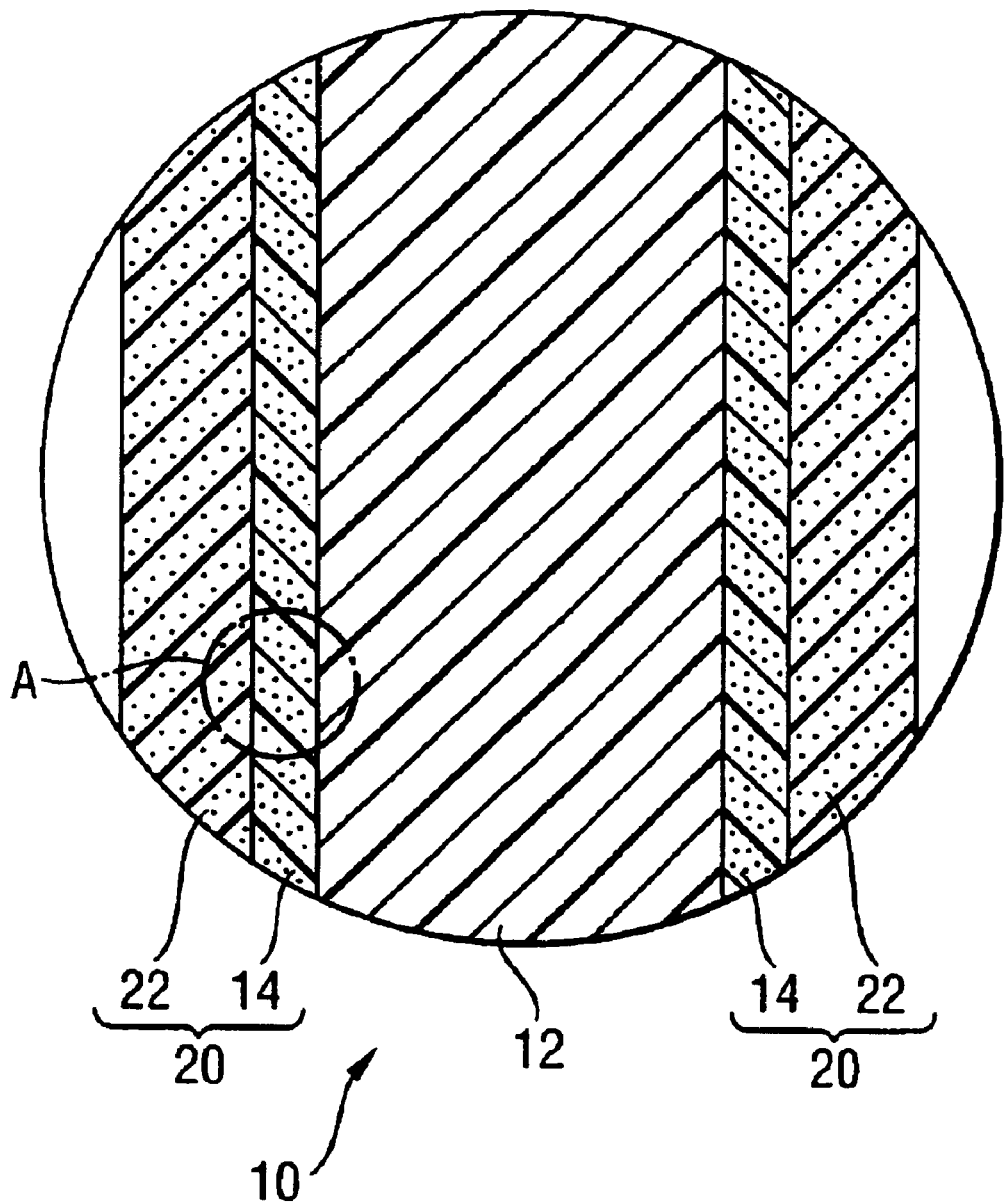
FIG. 1 is a cross section of a part of a fuel cell.

The present invention may include the step of obtaining a liquid medium comprising a prescribed basic polymer, a bridging agent, and a solvent. Typically, the basic polymer is dissolved in the solvent to obtain a solution, and the bridging agent is added to the solution, followed by mixing thereof.

As the basic polymer, the basic polymer including an amino group in a repeating unit is used. Since the amino group is present in the repeating unit, the polymer becomes basic and the amino group may react with the bridging agent in view of the reactivity with the bridging agent, the amino group in the repeating unit is preferably a primary amino group or a secondary amino group. The repeating unit in the basic polymer preferably contains an aromatic ring containing at least one nitrogen atom. The aromatic ring is preferably a five-membered ring or a six-membered ring containing one to three nitrogen atoms, which may be fused with another ring, particularly another aromatic ring.

Preferably, the basic polymer is soluble to the solvent. Specifically, a solution preferably dissolves not less than 1 percent by weight of the basic polymer and further preferably not less than 2 percent by weight. The features facilitates forming a uniform polymer membrane without forming pores therein. The basic polymer which may be used in accordance with the present invention includes polybenzimidazoles, polyimidazoles, polyvinylimidazoles, and polybenzbisimidazoles. Among these, polybenzimidazoles are preferable.

As for the polybenzimidazoles, those of the following formula are preferably used:

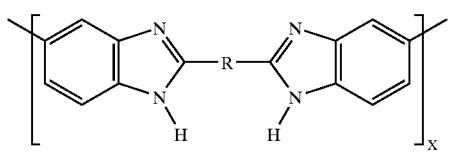

(I)

wherein R represents alkylene, perfluoroalkylene, or a substituent of any of the following formulae:

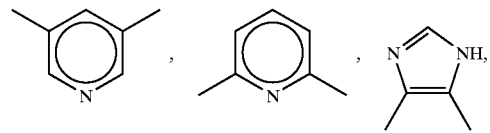

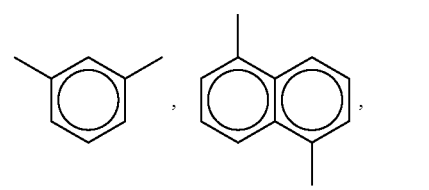

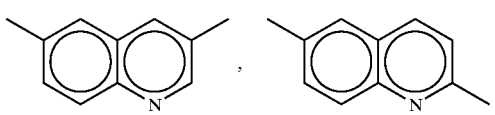

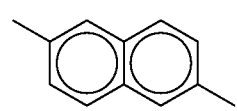

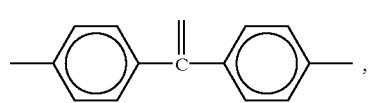

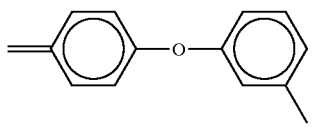

further wherein each of alkylene and perfuoroalkylene groups, which may be R, has 1 to 10 carbons preferably, and more preferably 1 to 6 carbons.

Furthermore, the basic polymers which may also be used are polybenzbisimidazoles of the following formula:

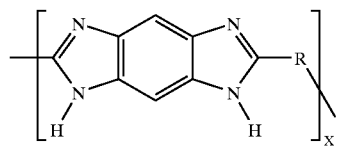

wherein R has the aforementioned meaning.

A strong acid group such as a sulfonic acid group($-SO_3H$), a phosphate monoester group($-O-P(=O)(OH)_2$) and so on may be introduced into the amino group of the polybenzimidazoles or the polybenzbisimidazoles through a linker.

As for the linker, the aforementioned R may be used. Alternatively, the linker may include a linear or branched hydrocarbon group having 1 to 20 carbon atoms, which may be substituted with a fluorine atom, which may be interrupted by an oxygen atom ($-O-$) or a group represented by a formula $-N(R^2)-$ wherein $R^2$ is a hydrogen atom or a lower alkyl group having 1 to 6 carbon atoms. The hydrocarbon group includes: a lower alkylene group having 1 to 20 carbon atoms, which may be interrupted by an oxygen atom or an arylene group such as a phenylene group, and which may be branched; and an arylene group such as a phenylene group, which may be substituted with a lower alkyl group, a lower alkoxy group, a sulfonic acid group, an amino group, a fluorine atom and so on. Alternatively, a group represented by a formula $-(CR^3R^4)_p-O-(CR^5R^6)_q-$ wherein p and q are independent, and each is an integer of 1 to 10; and $R^3$, $R^4$, $R^5$, and $R^6$ are independent, and each is the same or different and a hydrogen atom; a fluorine atom; a lower alkyl group or a lower alkoxy group having 1 to 6 carbon atoms; an aryl group such as a phenyl group which may be substituted with a lower alkyl group, a lower alkoxy group, a sulfonic acid group, an amino group, a fluorine atom and so on; or a strong acid group such as a sulfonic acid group, a phosphate monoester group, and preferably a hydrogen atom; a fluorine atom; or a lower alkyl group having 1 to 6 carbon atoms.

For example, a group represented by a formula $>N-(CR^3R^4)_r-SO_3H$ wherein N represents a nitrogen atom in the imidazole ring of the polybenzimidazoles or the polybenzbisimidazoles; r is an integer of 1 to 20; and $R^3$ and $R^4$ have the aforementioned meanings may be introduced into the polybenzimidazoles or the polybenzbisimidazoles.

When a strong acid group is introduced into the nitrogen atom of the polybenzimidazoles or the polybenzbisimidazoles through the linker, it is not necessary that the linker and the strong acid are introduced into all of the nitrogen atoms. The linker and the strong acid may be introduced into some of the nitrogen atoms, and hydrogen atoms may remain bonded to the other nitrogen atoms. The remaining nitrogen atoms may be reacted with the bridging agent, and therefore it is preferable.

For example, the linker and the strong acid may be introduced into 5 to 85 percent of the nitrogen atoms of the basic polymer such as the nitrogen atoms of the imidazole ring, and particularly, the linker and the strong acid may be introduced into 10 to 75 percent of the nitrogen atoms, and further particularly, the linker and the strong acid may be introduced into 15 to 40 percent of the nitrogen atoms.

The basic polymer may be reacted with a sulfone in a solution of the basic polymer to sulfonate or sulfoalkylate the basic polymer. In the reaction, for example, a solution of 1 to 30 percent by weight of the basic polymer may be used, and particularly, a solution of 5 to 20 percent by weight of the basic polymer may be used. As for the solvent for the sulfonation or sulfoalkylation, the solvent for the liquid medium, which will be described later, is preferably used.

The reaction is, for example, described in U.S. Pat. No. 5,599,639, U.S. Pat. No. 4,814,399 and Ahmed Mstafa, Chemical Review, pp. 195–223(1954), and these documents are incorporated herein as reference.

As the solvent used for the liquid medium, the solvent that does not react with the bridging agent is preferable. An organic solvent is preferable, and an organic solvent having polarity is further preferable. The organic solvent includes, for example, lower amides such as N-methyl-2-pyrrolidone, N,N-dimethylacetamide, dimethylformamide, dimethylsulfoxide and so on. A mixture of these solvents may be used.

The liquid medium may be either a solution or a suspension. In case of the solution, the basic polymer is dissolved in the solvent. In case of the suspension, particles of the basic polymer serving as a dispersion phase is dispersed in a solvent serving as a continuous phase. Alternatively, the liquid medium may be a slurry or a paste.

The bridging agent is not limited as long as the bridging agent includes a compound having a functional group reacting with an amino group. The bridging agent preferably has at least two functional groups for reacting with the amino group in the molecule thereof, and the bridging agent is typically an organic compound. Examples of such functional groups include epoxy groups and isocyanate groups. However, when the epoxy group and the isocyanate group are present in the molecule of the bridging agent, both groups react each other and therefore, it is not preferable.

The organic compound having not less than two epoxy groups and not less than two isocyanate groups includes, for example, an epoxy compound represented by formula (II), and an organic compound represented by formula (III). Further, the hydrogen atoms in the epoxy groups of the epoxy compound represented by formula (II) may be substituted by a halogen or a lower alkyl group.

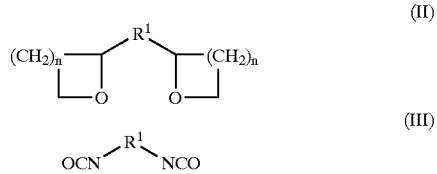

(II)

(III)

In the aforementioned formula, $R^1$ is a hydrocarbon group, including, for example, a linear chain or branched lower alkylene group which may be substituted by a nitro group, an oxygen atom, an epoxy group or an aryl group; and a linear chain or branched lower alkoxy group which may be substituted with a nitro group, an epoxy group or an aryl group. As for the aryl group, a phenyl group, a naphthalenyl group and an indenyl group can be mentioned. n is an integer of 0 or 1, and preferably 0.

Examples of $R^1$ include the following groups.

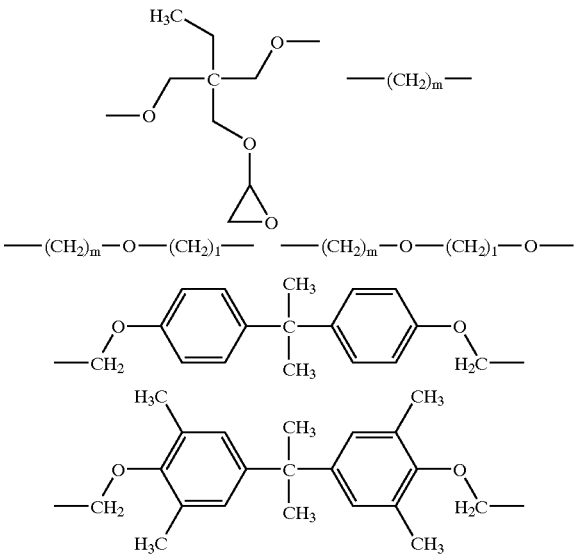

In the aforementioned formulae, m and l are the same or different and each is an integer of 1 to 6.

An example of the bridging agent having three functional group in the molecule, which reacts with an amino group is shown as follows.

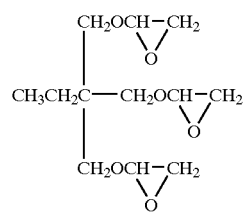

Preferably, the liquid medium contains at least 1 percent by weight of the basic polymer, and further preferably, the liquid medium contains at least 2 percent by weight of the basic polymer. Preferably, the liquid medium contains not more than 95 percent by weight of the basic polymer, and further preferably, the liquid medium contains not more than 80 percent by weight of the basic polymer, and particularly preferably, the liquid medium contains not more than 50 percent by weight of the basic polymer.

Preferably, the liquid medium contains 0.001 to 0.8 mole of the bridging agent per unit of the basic polymer, and further preferably, the liquid medium contains 0.01 to 0.5 mole of the bridging agent, and particularly preferably, the liquid medium contains 0.05 to 0.3 mole of the bridging agent. When an amount of the bridging agent is too much, it becomes difficult to impregnate a strong acid in the basic polymer. On the other hand, when an amount of the bridging agent is too small, the mechanical strength of the polymer membrane is not sufficiently improved.

Subsequently, the liquid medium is shaped into a membrane configuration to obtain a shaped membrane. For example, the liquid medium is cast onto a planar substrate, and then dried in a reduced pressure. Alternatively, the basic polymer may be shaped into the membrane configuration by a doctor-blade method.

The substrate for the casting or the doctor-blade method may be a semiconductor such as a silicon wafer, a synthetic polymer such as poiy(ethyleneterephthalate), and a metal such as a stainless steel. When a roll made of, for example, poly(ethyleneterephthalate) is used as the substrate, a continuous castor may be used to produce a shaped membrane having a constant width and any thickness. In this case, the liquid medium is cast onto the substrate, and go through a gap having a prescribed distance, and then go through a drying furnace for drying by a warm wind.

Alternatively, the basic polymer may be shaped into the membrane configuration according to the method as described in Japanese Patent Appln. Hei 10-125560, filed May 8, 1998: entitled "Method for Producing Polymer Electrolyte Membrane for Fuel Cell and Fuel Cell." Specifically, the liquid medium is poured into a cylinder having the inner surface having a cylindrical configuration, and subsequently, the cylinder is rotated. At that point, the solvent is allowed to evaporate through centrifugal force by the rotation; concurrently, a polymer membrane having a cylindrical configuration of substantially uniform thickness is formed on the inner surface of the cylinder. Thereafter, the polymer membrane having a cylindrical configuration is cut out to yield a shaped membrane having a membrane configuration. This method allows to form the basic polymer having a uniform matrix. The disclosure of Japanese Patent Appln. Hei 10-125560 is incorporated herein as reference.

In the present invention, the basic polymer is bridged by the bridging agent in the shaped membrane. Typically, the shaped membrane is heated to bridge the basic polymer by the bridging agent. However, it is not limited to heating, and a photochemical reaction may bridge the basic polymer by the bridging agent.

In the following description, an embodiment that the bridging agent is reacted by heating is mainly described. The aforementioned shaping step, in many cases, may include the step of heating the membrane for drying the shaped membrane. The heating for drying may form the shaped membrane and simultaneously bridge the basic polymer by the bridging agent in the basic polymer. To facilitate drying, it may be heated in a reduced pressure of not more than 1 atmospheric pressure, preferably not more than 0.1 atmospheric pressure and further preferably not more than 0.05 atmospheric pressure.

Alternatively, the heating for drying the shaped membrane may be determined to a temperature which is lower than the reaction temperature of the bridging agent, and subsequently, the shaped membrane may be distinctly heated for bridging the bridging agent. A warm wind may be used for the heating for drying or the heating for bridging.

For example, the epoxy compound represented by formula (IIa) is reacted with polybenzimidazole represented by formula (I) to bridge a polymer chain.

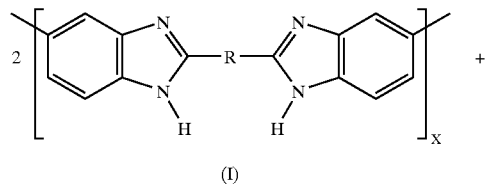

(I)

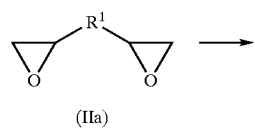

(IIa)

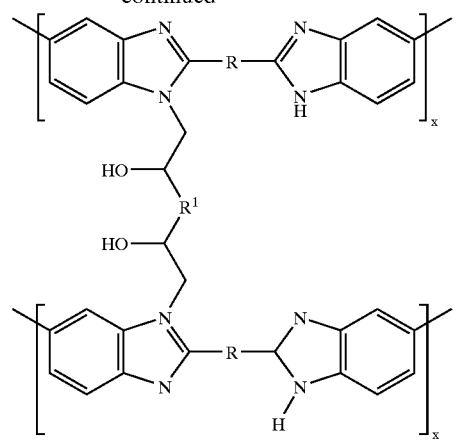

In the aforementioned formulae, $R^1$ is the same as defined above. Similarly, the isocyanate compound represented by formula (III) is reacted with polybenzimidazole represented by formula (I) to bridge a polymer chain.

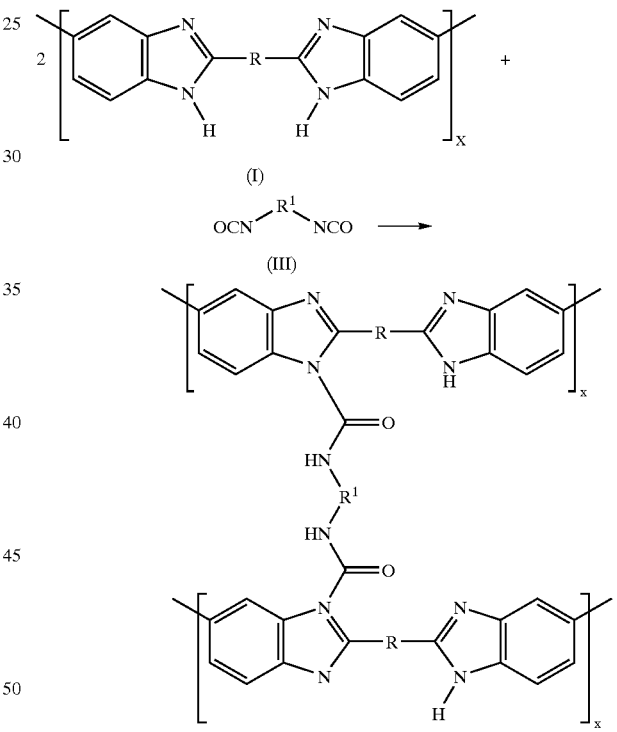

In the aforementioned formulae, $R^1$ is the same as defined above.

In the aforementioned formulae, it is described such that different polymer chains are bridged for convenience of the description. However, the same polymer chain may be bridged, and an inside of one repeated unit may be bridged.

In the present invention, preferably, the step of impregnating the basic polymer with a strong acid for providing proton conductivity may be included. The strong acid may be impregnated in the form of the liquid medium. Alternatively, the strong acid may be impregnated after the shaping but before the heating. Alternatively, the strong acid may be impregnated after heating.

The embodiment that strong acid is impregnated in the form of the liquid medium refers to adding a strong acid to the liquid medium. Preferably, the bridging agent does not react with the strong acid.

Preferably, the strong acid may be impregnated after heating the shaped membrane. The bridged, basic polymer has improved mechanical strength, and the handling thereof is easier. Since the bridging agent is already reacted, and therefore, the reaction of the strong acid with unreacted bridging agent is very limited. The bridged, basic polymer membrane may be immersed in the strong acid so that the strong acid is impregnated in the basic polymer membrane. The basic polymer may be immersed in a strong acid having a high concentration at a temperature of not less than 35° C., preferably not less than 40° C., further preferably not less than 50° for a period of not more than 5 hours, preferably not more than 1 hour. By carrying out the immersion step at 35° C. or above, it becomes possible to shorten the time for immersing the basic polymer in the strong acid. However, in view of the stability of the basic polymers and the safety precautions required to handle the strong acids at high temperatures, preferably, the immersion step is carried out at not more than 200° C. or below, more preferably at 100° C. or below, and most preferably at 80° C. or below.

Protic strong acids may be used as the strong acid. For example, phosphoric acid and sulfuric acid are preferably used.

As used in the present specification, the "phosphoric acid" includes phosphorous acid ($H_3PO_3$), onthophosphoric acid ($H_3PO_4$), pyrophosphoric add ($H_4P_2O_7$), triphosphoric acid ($H_5P_3O_{10}$), and metaphosphoric acid. The phosphoric acid, particularly orthophosphoric acid, preferably has a concentration of not less than 80 percent by weight; more preferably, a concentration of not less than 90 percent by weight; even more preferably, a concentration of not less than 95 percent by weight; and most preferably, a concentration of not less than 98 percent by weigh This is because the basic polymer can be impregnated with a larger number of strong acid molecules as the concentration of the strong acid increases.

The polymer electrolyte membrane obtained by the present invention, namely, the complex between the basic polymer and the strong acid, is proton conductive, and therefore, it may preferably be used as an electrolyte for cells. Nevertheless, the polymer electrolyte is not be limited to its use for the cell; but it can also be used as the electrolyte for a display element, an electrochromic element or a various sensor.

According to another aspect of the present invention, the polymer electrolyte membrane can preferably be used in the single cell for a fuel cell.

In referring to FIG. 1, the single cell for a fuel cell 10 has a polymer electrolyte membrane 12 and a pair of electrodes 20 sandwiching the polymer electrolyte membrane 12. Each of the electrode 20 has a catalytic layer 14 and a gas diffusion layer 22 for supplying a reaction gas with the catalytic layer 14.

Figure 2:
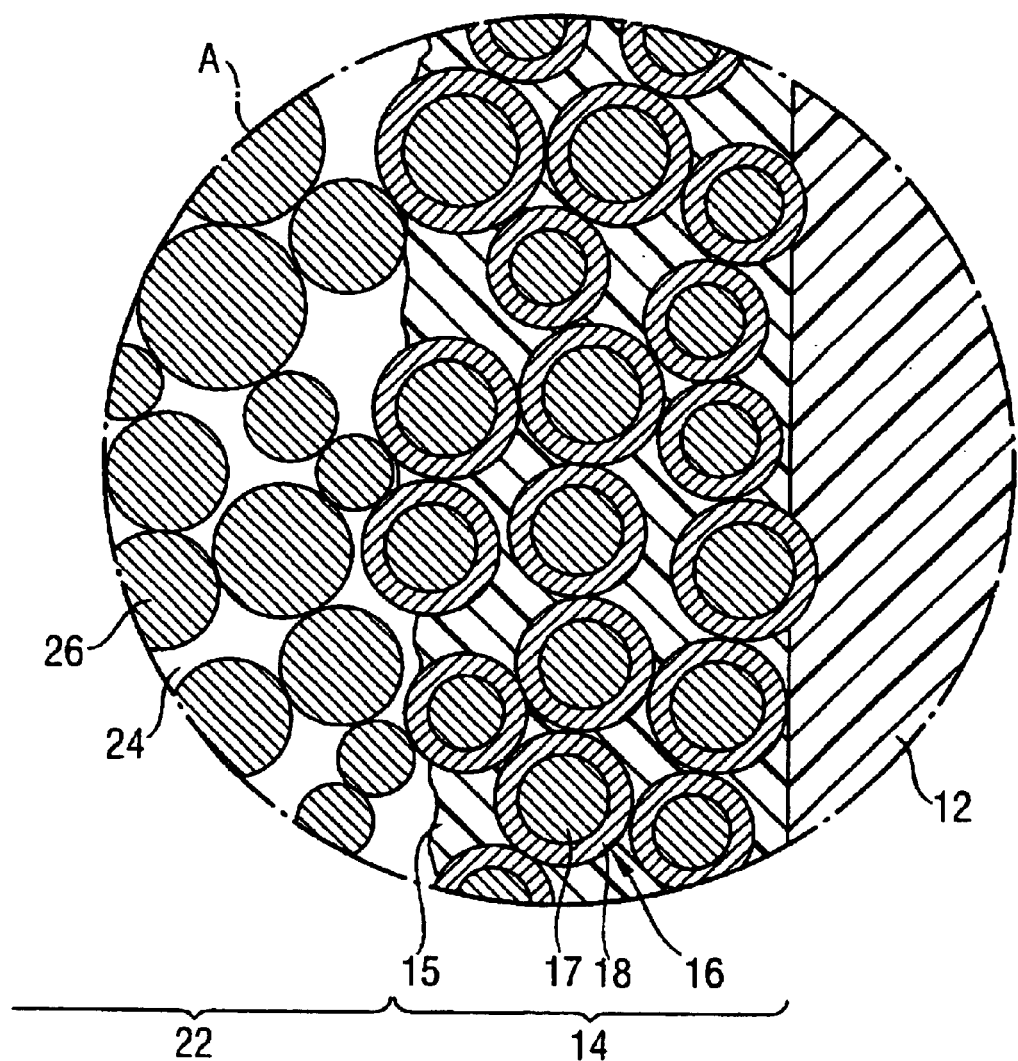
FIG. 2 is an enlarged portion A of FIG. 1.

In FIG. 2, the catalytic layer 14 has a matrix 15 consisting essentially of a polymer electrolyte membrane and a plurality of catalytic particles 16 being dispersed in the matrix. The matrix 15 along with the polymer electrolyte membrane 12 forms a channel for conducting hydrogen ions. The material for the matrix 15 is preferably the same as the material for the polymer electrolyte membrane 12. However, these materials may be different. The matrix 15 may be porous so as to allow the reactive gas to pass through. The catalytic particles preferably contact each other, thereby forming a channel for conducting electrons.

Each of the catalytic particles 16 has an electrically conductive carrier 17 and a catalytic substance 18 being loaded onto a surface of the electrically conductive carrier 17. The electrically conductive carrier may be carbon particles. The catalytic substance 18 may be platinum metal or a platinum alloy. In FIG. 2, the catalytic substance 18 is coated onto the surface of the electrically conductive carrier 17. Alternatively, the catalytic substance 18 may have a particle configuration.

The gas diffusion layer 22 is porous so as to allow the reactive gas to pass through. In FIG. 2, the gas diffusion layer 22 is made of a plurality of electrically conductive particles 26 forming a gap 24. The electrically conductive particles may be carbon particles and same as electrically conductive carrier 17. Alternatively, the electrically conductive particle 26 is replaced by electrically conductive substance such as carbon fibers.

The polymer electrolyte membrane in accordance with the present invention may be used as the electrolyte membrane 12. Moreover, the electrolyte membrane 12 as well as a precursor for a single cell having one of or both catalytic layers 14 may be produced. Furthermore, the single cell may be produced by fixing the gas diffusion layer 22 to the precursor.

EXAMPLES

The following examples are merely illustrative of the present invention, and are not to be construed as limitations thereof.

Example 1

Polybenzimidazole having the structural formula described below and having an intrinsic viscosity of 1.1 (available from Hoechst Celanese Inc.) was dissolved in N,N-dimethylacetamide to yield a solution having a resin concentration of 10 percent by weight.

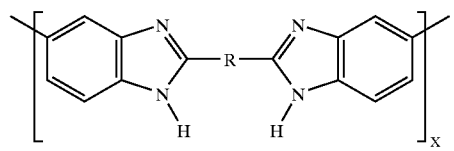

Subsequently, an amount shown in Table 1 of ethyleneglycoldiglycidylether as a bridging agent is added to the solution and mixed thereof. The mixed solution thus obtained was cast onto a 6-inch silicon wafer, and dried at 90° C. for four hours in a reduced pressure (10 mmHg) for forming a membrane and for proceeding the bridging reaction at the same time to obtain a cast film having a thickness of about 50 micrometer. The film thus obtained is flexible compared to unbridged polybenzimidazoles. The solubility of the cast film at room temperature in N,N-dimethylformamide was determined. The results are shown in Table 1.

TABLE 1

| Sample | Added Amount of Ethyleneglycoldiglycidylether (molar percent) | solubility in N,N-dimethylacetamide |
| --- | --- | --- |
| 1 | 100 | insoluble, no swelling |
| 2 | 50 | insoluble, no swelling |
| 3 | 15 | insoluble, swelling |
| 4 | 10 | insoluble, swelling |

TABLE 1-continued

| Sample | Added Amount of Ethyleneglycoldiglycidylether (molar percent) | solubility in N,N-dimethylacetamide |
|---|---|---|
| 5 | 5 | insoluble, swelling considerably |
| 6 | 0 | soluble |

Example 2

The bridged polybenzimidazole obtained in Example 1 (50 micrometer thickness) was cut out in 3-cm square pieces. The films were washed with water to wash away the remaining N,N-dimethylacetamide. Then, they were dried at a reduced pressure and the weights of the films were measured.

Thereafter, the dried polybenzimidazole films were placed in sample vials. To each of these was added 30 ml of 85 percent by weight aqueous orthophosphoric acid, and then immersed at mom temperature for 72 hours. Subsequently, the polybenzimidazole films impregnated with orthophosphoric acid were removed from the phosphoric acid, and excess phosphoric acid on their surfaces was thoroughly wiped off with filter papers. Subsequently, the weight increments were determined by weighing. After weighing, the polybenzimidazole films were placed in 1-liter volumetric flasks, and deionized water was filled up to the measuring lines and stirred. Orthophosphoric acid was extracted from the polybenzimidazole films to obtain aqueous phosphoric acid solutions. The aqueous phosphoric acid solutions thus obtained were titrated with 0.02 N sodium hydroxide solution, and the quantities of orthophosphoric acid being impregnated in the polybenzimidazole films were determined. The difference between the weight increment after impregnation with orthophosphoric acid and the weight of orthophosphoric acid of impregnation was calculated to be the quantity of the water that had been adsorbed to each polybenzimidazole film impregnated with orthophosphoric acid. These results are shown in Table 2.

TABLE 2

| Sample | Added Amount of Ethyleneglycol-diglycidylether (molar %) | Number of phosphoric acid molecules impregnated per repeating unit of the polymer | Number of water molecules impregnated per repeating unit of the polymer |
|---|---|---|---|
| 1 | 100 | 0 | — |
| 2 | 50 | 0 | — |
| 3 | 15 | 6.59 | 9.83 |
| 4 | 10 | 6.61 | 11.83 |
| 5 | 5 | 7.74 | 13.08 |

The results show that the bridged polymer membranes that is impregnated with so orthophosphoric acid are obtained. Therefore, such polymer membrane may be used as an electrolyte membrane for a fuel cell.

Even though an added amount of the bridging agent is at least 50 percent by mole, it is possible to impregnate phosphoric acid by increasing temperatures of the phosphoric acid to 50° C. However, in this case, it takes at least seven days for impregnation, and the mechanical strength after impregnation decreases, and the film became brittle.

Example 3

Polybenzimidazole having the structural formula described in Example 1 and having an Intrinsic viscosity of 1.1 (available from Hoechst Celanese Inc.) was dissolved in N,N-dimethylacetamide to yield a solution having a resin, concentration of 10.0 percent by weight. Subsequently, 10 percent by mole based on a unit of polybenzimidazole of ethyleneglycoldiglycidylether as a bridging agent is added to the solution and mixed thereof.

65 gram of the solution was introduced into a stainless-steel cylinder having a cylindrical configuration with an inner diameter of 141 millimeter and a length of 408 millimeter. The cylinder was rotated at 90° C. for two hours at 2500 rpm to obtain a bridged membrane of polybenzimidazole having a cylindrical configuration. A thickness of the polybenzimidazole membrane was determined at any six points. An average of the thickness was 47 micrometers.

Example 4

A polybenzimidazole bridged membrane of Example 3 was immersed in 85 percent by weight phosphoric acid at room temperature for 96 hours to yield a polymer electrolyte membrane. This polymer electrolyte membrane was cut out in a circular piece. Next, it was sandwiched by two sheets of carbon electrodes for a fuel cell of the polymer electrolyte type, which were commercially available, and hot-pressed at 140° C. and 50 kgf/cm$^2$ (1 kgf is equivalent to about 9.8 Newton) to yield a single cell for fuel battery. When hydrogen and air were introduced into this single cell for generating electricity, following outputs were obtained: 300 mW/cm$^2$ at 160° C. and 0.5 V under 1 atmospheric pressure, and 475 mW/cm$^2$ at 160° C. and 0.5 V under 3 atmospheric pressures, respectively.

Comparative Example 1

Polybenzimidazole having a sulfobutylene group (—(CH$_2$)$_4$—SO$_3$H) in a side chain was prepared in a method of Example 1 of U.S. Pat. No. 5,599,639. Namely, polybenzimidazole having the following repeating unit was prepared.

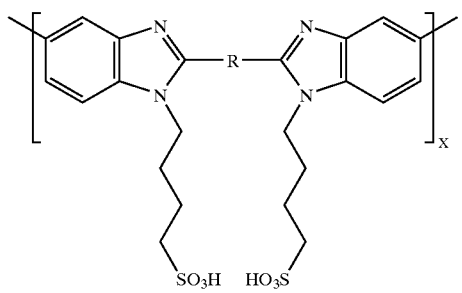

Poly 2,2'-(m-phenylene)-5,5'-bibenzimidazole was dissolved in N-methyl-2-pyrrolidone, and then lithium hydride was added to the solution. Subsequently, the solution was heated to 70° C. for 12 hours under stirring. After the bubbling ceased, a mixture of 9 parts by mole of 1,4-butanesultone and N-methyl-2-pyrrolidone were added dropwise by an addition funnel. Subsequently, the solution was further heated to 70° C. for 12 hours under stirring. Thus, poly 2,2'-(m-phenylene)-N,N'-sulfobutylene-5,5'-bibenzimidazole having a sulfonation rate of 70.5 percent was obtained.

The polymer was dissolved in dimethylsulfoxide to obtain a polymer solution having a polymer concentration of 5 percent by weight The solution was cast onto a 6-inch silicon wafer, and dried at 90° C. for four hours in a reduced pressure (10 mmHg) for forming a membrane and for proceeding the bridging reaction at the same time to obtain a cast film. When the cast film thus obtained was immersed in pure water, the cast film considerably swelled so that the film configuration was not kept. The film could not be recovered from the water.

Example 5

To 15 gram of the polymer solution of Comparative Example 1 was added 0.0912 gram of ethyleneglycoldiglycidylether, and mixed thereof. In the solution, a molar ratio of the unsubstituted imidazole group to ethyleneglycoldiglycidylether was about 2:1. The mixed solution thus obtained was cast onto a 6-inch silicon wafer, and dried at 90° C. for four hours in a reduced pressure (10 mmHg) for forming a membrane and for proceeding the bridging reaction at the same time to obtain a cast film. When the cast film thus obtained was immersed in pure water, the film swelled, and it was easily peeled off from the silicon wafer while the film kept the film configuration. A thickness during containing water was about 65 micrometer.

The proton conductivity of the bridged, butylsulfonated polybenzimidazole thus obtained in water was measured by a complex impedance process, and it was 51 mS/cm at 25° C. and 118 mS/cm at 57° C.

Therefore, it is confirmed that the present invention may be applied to a basic polymer having proton conductivity.

In the present invention, shaping a basic polymer into a membrane configuration and then proceeding a bridging reaction allow to improve the mechanical strength of the basic polymer. Adjusting an amount of the bridging agent allows to maintain a capacity of the basic polymer to impregnate a strong acid.

What is claimed is:

1. A method for producing a bridged polymer membrane, comprising the steps of:
   obtaining a liquid medium comprising a basic polymer having an amino group in a repeating unit, a bridging agent, and a solvent; shaping the liquid medium into a membrane configuration to obtain a shaped membrane; and
   bridging the basic polymer by the bridging agent in the shaped membrane and said basic polymer contains an aromatic ring containing at least nitrogen atom.

2. The method as claimed in claim 1, wherein the bridging agent has at least two epoxy groups or isocyanate groups in the molecule.

3. The method as claimed in claim 2, wherein the liquid medium contains 0.001 to 0.8 mole of the bridging agent per unit of the basic polymer.

4. The method as claimed in claim 3, wherein the basic polymer is selected from the group consisting of polybenzimidazole, polyimidazole, polyvinylimidazole and polybenzbisimidazole.

5. The method as claimed in claim 2, wherein the liquid medium contains 0.01 to 0.5 mole of the bridging agent.

6. The method as claimed in claim 2, wherein the liquid medium contains 0.05 to 0.3 mole of the bridging agent.

7. The method as claimed in claim 1, wherein the liquid medium contains 0.001 to 0.8 mole of the bridging agent per unit of the basic polymer.

8. The method as claimed in claim 1, wherein the basic polymer is selected from the group consisting of polybenzimidazole, polyimidazole, polyvinylimidazole and polybenzbisimidazole.

9. The method as claimed in claim 1, further comprising the step of impregnating the basic polymer with a strong acid for providing proton conductivity.

10. A fuel cell comprising a plurality of single cells, each of the single cells comprising a bridged polymer membrane obtained by the method as claimed in claim 9, and a pair of electrodes sandwiching the bridged polymer membrane.

11. The method as claimed in claim 1, wherein the basic polymer has a strong acid group in the repeating unit in the basic polymer.

12. The method as claimed in claim 1, wherein said amino group is a primary amino group or a secondary amino group.

13. The method as claimed in claim 1, wherein said basic polymer is polybenzbisimidazole.

14. The method as claimed in claim 13, wherein a strong acid group is introduced into the amino group of a polybenzimidazole through a linker.

15. A method for producing a bridged polymer membrane, comprising the steps of:
   obtaining a liquid medium comprising a basic polymer having an amino group in a repeating unit, a bridging agent, and a solvent; shaping said liquid medium into a membrane configuration to obtain a shaped membrane; and
   bridging the basic polymer by the bridging agent in the shaped membrane and said bridging agent has at least two epoxy groups or isocyanate groups in the molecule and said liquid medium contains 0.001 to 0.8 mole of the bridging agent per unit of the basic polymer.

* * * * *